Patented Feb. 6, 1940

2,189,564

UNITED STATES PATENT OFFICE 2,189,564

DISINFECTANT AND WOUND REMEDY AND THE PRODUCTION THEREOF

Helene Goldhammer, Vienna, Austria, assignor to Arnold Frenkel, Vienna, Austria

No Drawing. Application August 9, 1937, Serial No. 158,154. In Austria August 18, 1936

10 Claims. (Cl. 167—58)

This invention relates to disinfectants and media for use in the treatment of wounds, and to the production of the same. A variety of disinfectants and wound treating agents are already known. The medium or preparation according to the present invention has the great advantage of a surprisingly good effect which extends into deeper layers, and of counteracting inflammation, when applied to wounds. It does not give rise to any irritation, and prevents the breaking down of the cells exposed by the wounds. Moreover, it has been found to be particularly efficacious in the treatment of wounds in diabetic patients, which are known to heal with great difficulty.

The medium according to the invention contains, as effective constituents, a cresol, tannin, and an aqueous liquid. To these ingredients there may with advantage be added a soap, preferably a resin soap, or a mixture of resin soaps. The term "a cresol" is to be understood as meaning each of the three isomeric cresols or a mixture of isomers such as likewise occurs in the commercial product referred to as cresol. As aqueous liquid it is in many cases sufficient to use water. It is also advantageous to add to the already mentioned constituents water-soluble salts of boroglyceric acid, and also, if desired, formaldehyde. For the treatment of open wounds I have found a medium to be particularly satisfactory which consists of a cresol, a resin soap, tannin, and an aqueous liquid containing water-soluble salts of boroglyceric acid, formaldehyde, a double salt of antipyrine, and a silver-protein compound. For use as the double salt of antipyrine in this mixture I have found antipyrine caffeine citrate, and as silver-protein compound silver proteinate to be particularly suitable. Instead of a cresol and a resin soap or mixture of resin soaps there may also be employed the product known to commerce as "Creolin" which represents a mixture of cresols with resin soaps. In addition to the above-mentioned effective substances the medium according to the invention may also contain protective colloids for the purpose of increasing the solubility or suspensibility of the effective substances in the aqueous liquid. The quantity of boroglyceric salts used may also be intentionally so determined that the resulting medium represents a liquid in which at least a preponderating amount of the effective substances is constantly maintained in a suspended or colloidal form. As solvent or suspending agent and reaction medium there serves water or a dilute aqueous solution.

The present invention relates in particular to a medium for use as a disinfectant and in the treatment of wounds, which contains, as effective constituent, a product of the reaction between a cresol and tannin, this reaction product being chemically defined by the fact that, when polarographically measured in an approximately 0.1 normal glycerine-containing NaOH solution, it exhibits a reduction potential at minus 0.7 volt (with a limit of error of ±0.1 volt). The polarographic measurement is assumed to be carried out as described in the book on polarography by J. Heyrovsky in W. Boettger's "Physikalische Methoden der analytischen Chemie", vol. II (1936). In addition to this reaction product, the medium according to the invention may also contain a further product of reaction between formaldehyde and tannin, which is characterized by a reduction potential at —1.22 to —1.26 volt (limit of error ±0.1 v.) measured in a similar manner. It is also of advantage to add a water soluble protective colloid to this medium. In addition to the said new reaction products, the medium may also contain an excess of one of the reaction partners, for example of tannin. For the treatment of wounds I have found a medium to be particularly well suited which, if desired in addition to other therapeutically active substances and/or the above described compounds, contains the product of the reaction between cresol and tannin in an extremely finely divided state in an ointment base containing at least slight quantities of water.

To produce the novel medium according to the invention I prefer to react together an aqueous or water-containing solution of cresols, preferably in the presence of soaps such as resins soaps or mixtures thereof, for instance "Creolin", with an aqueous or water-containing solution of tannin, in the absence of condensing agents. At the same time additions capable of increasing the solubility of the reaction product, or protective colloids, may conveniently be introduced into the reaction mixture or the solution of one of the reaction partners. The solubility of the reaction product is also increased by an addition of water-soluble salts of boroglyceric acid. The quantity of these salts added should be such that the reaction products, at least to a preponderating extent, remain permanently in the solution in an extremely finely suspended or colloidal form. The disinfectant and therapeutic properties of the medium produced by the method according to the present invention may be still further improved for many purposes if the described conversion reaction be allowed to take place in the presence of other therapeutically active substances. Water or aqueous solutions serve as the solvent or suspending agent and reaction medium used. To produce the new medium in the form of an ointment the procedure is preferably to dissolve each of the reaction partners by itself in as little water or aqueous liquid as possible, and then to work the individual solutions perfectly homogeneously into an ointment base, preferably a lanolin ointment or lanolin itself. The conversion reaction between the reaction partners then takes place in the ointment base itself, the final product being thereby rendered absolutely homogeneous. Here again it is advantageous, if other therapeutically effective substances be added, to admix these substances, dissolved in a small amount of solvent, to the ointment base, likewise one by one or in the course of the working in of the reaction partners. In this manner an extremely fine subdivision and distribution of all the additionally admixed substances is achieved, by virtue of the fact that the conversion reaction takes place in the ointment base itself. The production of the new medium is very simple and also economical, since it is unnecessary to use separate solvents for the reaction product, and the medium may be used in the aqueous reaction medium employed for its production. For the production of the medium according to the invention the individual constituents are preferably employed in the following proportions. To produce 100 grams of finished product, either in the form of a liquid or of an ointment, a mixture of cresols and soaps, such as resin soaps, for instance "Creolin", in a proportion of 0.2 to 2%, and tannin in a proportion of 2.5 to 5%, is caused to react together. The limits of the proportions of the other named substances used may with advantage be as follows: boroglyceric salts dissolved in aqueous formaldehyde in a proportion of from 0.2 to 5%, an antipyrine double salt in a proportion of from 0.05 to 0.2%, and a silver-protein compound in a proportion of from 0.01 to 0.1%.

By polarographic tests I have ascertained that when these constituents react upon each other a chemical conversion takes place. Thus, when cresols react upon tannin in aqueous solution there becomes evolved a new compound which is characterized by a reduction potential at −0.7 volt (within ±0.1 volt) measured in an approximately 0.1 normal glycerine-containing NaOH solution. The same compound is evolved in the presence of soaps such as resin soaps, as are present for example in "Creolin". The presence of soaps has the effect of increasing the solubility of the starting and reaction products while at the same time reducing the virulence of the cresol.

*Examples*

(1) In approximately 40 grams of water there are dissolved 0.5 gram of highly purified creolin, 4 grams of "boroform" (a mixture of sodium glyceroborate and formaldehyde), and if desired 0.1 gram of antipyrine caffeine citrate. With this solution there is reacted a solution of 5 grams of tannin in 50 ccs. of water, to which there may be added if desired 0.05 gram of silver proteinate, and the liquid made up to 100 ccs. with water. In this manner there is obtained the final product containing a finely suspended precipitate which is present at least partially in a colloidal state. By the addition of further protective colloids, such as for example gum arabic, preferably before the individual dissolved constituents are brought together, the stability of the colloidal state can be still further very considerably increased. The products obtained in this manner are also admirably suited for use as irrigating liquids when greatly diluted, for example in a dilution of 1:100.

(2) 0.5 gram of "Creolin", 0.2 gram of antipyrine caffeine citrate, and 0.3 gram of boroform are each separately dissolved or dispersed in as small a quantity of water as possible (a few ccs.). These aqueous solutions are then intimately worked, preferably one by one, into 90 grams of ointment base, for instance lanolin. 4 grams of tannic acid and if desired 0.03 gram of silver proteinate are then likewise dissolved in as little water as possible, and this solution likewise worked into the ointment base. If it is desired that the ointment base contain more water the individual ingredients are dissolved in somewhat larger quantities of water and worked into a correspondingly smaller amount of ointment base.

I claim:

1. The process of manufacturing a composition adapted to be used in the treatment of wounds and as a disinfectant which process comprises reacting in the absence of a condensing agent an aqueous, approximately at least 0.2% of cresol containing solution and an aqueous, approximately at least 2.5% tannin containing solution, said composition when measured polarographically in an approximately $\frac{1}{10}$ normal NaOH solution containing glycerine shows a reduction potential of about −0.7 volt with an error limit of ±.1 volt.

2. A composition adapted to be used in the treatment of wounds and as a disinfectant containing as an active component a reaction product of an aqueous, at least approximately 0.2% of a cresol containing solution and of an aqueous, at least approximately 2.5% tannin containing solution said composition when measured polarographically in an approximately $\frac{1}{10}$ normal NaOH solution containing glycerine shows a reduction potential of about −0.7 volt with an error limit of ±.1 volt.

3. A composition adapted to be used in the treatment of wounds and as a disinfectant containing as an active component a reaction product of an aqueous, approximately 0.2 to 2% of a cresol and of an aqueous approximately 2.5 to 5% tannin containing solution said composition when measured polarographically in an approximately $\frac{1}{10}$ normal NaOH solution containing glycerine shows a reduction potential of about −0.7 volt with an error limit of ±.1 volt.

4. The process according to claim 1 consisting in using an approximately 0.2 to 2% cresol containing aqueous solution and an approximately 2.5 to 5% tannin containing aqueous solution.

5. Process according to claim 1 which is carried out in the presence of a water soluble protective colloid.

6. Process according to claim 1 which is carried out in the presence of resin soap.

7. Process according to claim 1 which is carried out in the presence of boroglycerine acid salts.

8. A composition according to claim 2 characterized by the further presence of a water soluble protective colloid.

9. A composition according to claim 2 characterized by the further presence of a resin soap.

10. A composition according to claim 2 characterized by the further presence of boroglycerine acid salts.

HELENE GOLDHAMMER.